(12) United States Patent
Svarre et al.

(10) Patent No.: US 10,941,784 B2
(45) Date of Patent: Mar. 9, 2021

(54) CENTRIFUGAL PUMP

(71) Applicant: GRUNDFOS HOLDING A/S, Bjerringbro (DK)

(72) Inventors: Erik Bundesen Svarre, Bjerringbro (DK); John Frigård Nielsen, Fårup (DK); Lars Skov, Ulstrup (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 106 days.

(21) Appl. No.: 16/056,903

(22) Filed: Aug. 7, 2018

(65) Prior Publication Data
US 2019/0048885 A1 Feb. 14, 2019

(30) Foreign Application Priority Data
Aug. 8, 2017 (EP) ..................... 17185365

(51) Int. Cl.
*F04D 29/10* (2006.01)
*F16J 15/34* (2006.01)
(Continued)

(52) U.S. Cl.
CPC .............. *F04D 29/10* (2013.01); *F04D 1/06* (2013.01); *F04D 13/06* (2013.01); *F04D 17/08* (2013.01);
(Continued)

(58) Field of Classification Search
CPC ...... F04D 29/10; F04D 29/426; F04D 29/126; F04D 29/622; F04D 29/42; F04D 25/06;
(Continued)

(56) References Cited

U.S. PATENT DOCUMENTS 1,888,957 A * 11/1932 Longenecker ......... F16J 15/348
277/391
2,429,953 A * 10/1947 Bottomley ............... F16J 15/38
277/373
(Continued)

FOREIGN PATENT DOCUMENTS

CA 2331146 A1 7/2002
CN 2428667 Y 5/2001
(Continued)

OTHER PUBLICATIONS

Grundfos industrial pump handbook, p. 32, Figure 1.312, publisher Grundfos GmbH 40699 Erkrath, www.machining.grundfos.de/media/60727/grundfos_pumpenhandbuch.pdf.

*Primary Examiner* — Kenneth Bomberg
*Assistant Examiner* — Adam W Brown
(74) *Attorney, Agent, or Firm* — McGlew and Tuttle, P.C.

(57) ABSTRACT

A centrifugal pump (1) includes a pump casing and a shaft (11) which is rotatably mounted therein and on which an impeller (10), for delivering fluid, is arranged rotationally fixed. A cartridge shaft seal (13) is arranged between the shaft (11) and an opening (16) of the casing, through which opening the shaft (11) is led. The cartridge shaft seal (13) includes a sleeve (22) which surrounds the shaft (11) at least in the region of the opening 16 and which is connected to the shaft (11) releasably and rotationally fixed, by way of a clamping device (29) which is arranged on the outer side of the sleeve (22). The clamping device (29) includes clamping jaws (32) which only engage on the outer side of the sleeve (22) and non-positively connect the sleeve (22) to the shaft (11).

16 Claims, 5 Drawing Sheets

(51) Int. Cl.
*F04D 29/12* (2006.01)
*F04D 29/42* (2006.01)
*F04D 1/06* (2006.01)
*F04D 13/06* (2006.01)
*F04D 17/08* (2006.01)
*F04D 25/06* (2006.01)
*F04D 29/62* (2006.01)

(52) U.S. Cl.
CPC ........... *F04D 25/06* (2013.01); *F04D 29/126* (2013.01); *F04D 29/42* (2013.01); *F04D 29/426* (2013.01); *F04D 29/622* (2013.01); *F16J 15/348* (2013.01)

(58) Field of Classification Search
CPC . F04D 17/08; F04D 13/06; F04D 1/06; F04D 29/628; F04D 29/106; F04D 1/00; F16J 15/348
See application file for complete search history.

(56) References Cited

U.S. PATENT DOCUMENTS

| | | | | |
|---|---|---|---|---|
| 4,538,821 A * | 9/1985 | Wallace | ............... | F16J 15/348 277/374 |
| 4,746,268 A * | 5/1988 | Sugimoto | ............ | F16J 15/3488 277/399 |
| 5,294,132 A * | 3/1994 | Duffee | ................... | F16J 15/348 277/358 |
| 5,344,164 A * | 9/1994 | Carmody | ............ | F16J 15/3472 277/371 |
| 6,357,753 B1 * | 3/2002 | Yamasaki | .............. | F16J 15/002 277/370 |
| 6,685,191 B2 * | 2/2004 | Toal | ..................... | F16J 15/3404 277/352 |
| 9,587,743 B2 * | 3/2017 | Jaskot | .................. | F16J 15/4476 |
| 2002/0125648 A1 * | 9/2002 | Vedsted | ................. | F16J 15/348 277/358 |
| 2004/0201176 A1 * | 10/2004 | Bjornson | ............. | F16J 15/3488 277/370 |
| 2010/0115733 A1 | 5/2010 | Caillau | | |

FOREIGN PATENT DOCUMENTS

| | | |
|---|---|---|
| CN | 101586666 A | 11/2009 |
| CN | 101668979 A | 3/2010 |
| CN | 202691353 U | 1/2013 |
| CN | 202812546 U | 3/2013 |
| JP | H0854067 A | 2/1996 |
| JP | 2014173669 A | 9/2014 |
| JP | 2016114085 A | 6/2016 |
| WO | 8902999 A1 | 4/1989 |
| WO | 2013/143446 A1 | 10/2013 |

\* cited by examiner

CENTRIFUGAL PUMP

CROSS REFERENCE TO RELATED APPLICATIONS

This application claims the benefit of priority under 35 U.S.C. § 119 of European Application 17185365.8, filed Aug. 8, 2017, the entire contents of which are incorporated herein by reference.

FIELD OF THE INVENTION

The invention relates to a single-stage or multi-stage centrifugal pump with a pump casing and with a shaft which is rotatably mounted therein, with at least one impeller which is rotationally fixedly arranged on the shaft for delivering fluid, with a cartridge shaft seal which is arranged between the shaft and an opening of the casing, through which opening the shaft is led as well as to a cartridge shaft seal for such a centrifugal pump.

BACKGROUND OF THE INVENTION

With regard to centrifugal pumps, it is counted as belonging to the state of the art to seal the end of the shaft which is at the delivery side and on which one or more impellers are seated, with respect to the pump casing by way of a shaft seal arrangement. Such a seal arrangement comprises a slide ring which rotates with the shaft, as well as a stationary slide ring which is fixedly arranged on the casing, the sliding surfaces of said rings forming a sealing gap which on operation of the pump as a rule is fluid-lubricated by the fluid delivered by the pump. The rotating slide ring and the stationary slide ring are moreover sealed with respect to the shaft and the pump casing respectively by way of sealing rings. Here, one of the rings of the shaft seal is arranged in an axially displaceable manner and subjected to a spring force, in order to keep the sealing gap closed as much as possible and thus to ensure the sealing function. It is counted as belonging to the state of the art to design such a sealing arrangement as a cartridge shaft seal, so as not to have to disassemble the complete pump in the case of a defect of the seal. A sleeve which surrounds the shaft at least on the region of the casing opening and which is connected to the shaft in a releasable but rotationally fixed manner by way of a clamping device arranged on the outer side of the sleeve is provided. Such cartridge shaft seals are nowadays counted as belonging to the state of the art in the case of pumps and the Grundfos industrial pump handbook, page 32, FIG. 1.312, publisher Grundfos GmbH 40699 Erkrath, www.machining.grundfos.de/media/60727/grundfos_pumpenhandbuch.pdf where the construction of such a cartridge seal is represented and explained in detail is referred to.

The sleeve is welded to a ring which comprises radial threaded bores, via which the sleeve is fastened to the shaft by clamping. The tips of the screws thereby engage into the surface of the shaft, so that a certain positive fit also arises. The sleeve is sealed with respect to the shaft by way of an O-ring. The disadvantage of this arrangement is the fact that on exchange of the cartridge seal, the holes which are formed in the shaft by the tips of the screws need to be machined by way of polishing, so that on installation, the otherwise present sharp edges do not damage the O-ring which is provided between the sleeve and the shaft and which needs to be pushed over this region on exchanging the cartridge. A further disadvantage is that great care is necessary on assembly, in order to ensure that the grub screws all penetrate equally deeply into the shaft and the sleeve is arranged in a manner centered to the shaft. Finally, the weld connection between the ring and the sleeve necessitates the cartridge sleeve not being able to be disassembled as such, so that an exchange of individual seals is not possible, but the complete cartridge seal must be exchanged.

SUMMARY OF THE INVENTION

Against this background, it is the object of the invention to design a centrifugal pump of the known type, such that the disadvantages mentioned above do not occur and a cartridge shaft seal which is designed accordingly is provided.

The single-stage or multi-stage centrifugal pump according to the invention comprises a pump casing with a shaft which is rotatably arranged therein and on which the at least one impeller for delivering fluid is arranged in a rotationally fixed manner. The centrifugal pump comprises a cartridge shaft seal which is arranged between the shaft and opening of the pump housing, through which opening the shaft is led. The cartridge shaft seal comprises a sleeve which surrounds the shaft at least in the region of the opening and which is connected to the shaft in a releasable and rotationally fixed manner via clamps by way of a clamping device which is arranged on an outer side of the sleeve. According to the invention, the clamps of the clamping device only engages on the outer side of the sleeve, and specifically in a manner such that the sleeve is connected to the shaft exclusively in a non-positive manner.

The basic concept of the invention is therefore to provide a clamping device with clamps on the outer side of the sleeve and to fix this sleeve on the shaft by way of clamping, thus such that the sleeve is exclusively non-positively connected to the shaft and clamps do not pass through the sleeve or clamps do not engage directly upon the shaft, as is the case in the state of the art. Due to the fact that the clamps engage on the outer side of the sleeve, thus act upon the shaft only indirectly, the surface of the shaft remains undamaged, so that even after exchanging the cartridge shaft seal, the O-ring between the sleeve and the shaft can be displaced along the shaft without this O-ring becoming damaged in an O-ring surface and thus with regard to an O-rings sealing effect. Since the clamps only engage on the outer side of the sleeve, a centered fastening of the sleeve on the shaft is significantly simpler to realize than is the case with the state of the art.

The present invention is preferably applicable to single-stage or multi-stage centrifugal pumps of the inline construction type with a vertically arranged rotation axis, but is not restricted to these.

It is particularly advantageous if the clamping device is releasably connected to the sleeve, as is envisaged in a further development of the invention. The releasable connection of the clamping device to the sleeve creates the basic precondition for being able to disassemble the cartridge seal, so that by way of this it is possible to exchange possibly worn slide rings, the springs or other components of the cartridge shaft seal, in order to repair or replace these components. Thereby, it is also possible to assess the cause of any leakage, because the components of the cartridge shaft seal do not have to be cut for disassembly.

According to an advantageous further development of the invention, the clamping device comprises at least two clamping components which sectionally surround the sleeve and which via screws which are preferably arranged tangentially or parallel thereto are connected to one another such that clamping forces acting upon the sleeve are exerted via the clamping components by way of tightening the screws. The arrangement of at least two clamping components is useful with regard to the centering of the clamping device to the sleeve, and basically an arrangement with only one clamping component is also conceivable if this centering is not necessary for whatever reason.

The screw connection between adjacent clamping components is advantageously configured such that the longitudinal axis of the screw is arranged perpendicularly to a partition plane of the clamping components to be connected, wherein this partition plane is preferably a radial partition plane.

With regard to manufacturing and assembly technology, it is particularly advantageous if, according to a further development of the invention, the preferably two clamping components are configured in an identical manner. However, such a design can also be realized if three or more clamping components are provided. This reduces the manufacturing and storage costs and simplifies the assembly, since it is ensured that only one type of clamping component can be fitted.

Here, it is particularly advantageous if each clamping component comprises at least one clamping jaw which is envisaged for bearing on the sleeve and which preferably at its inner side is designed such that it is adapted to the outer contour of the sleeve and/or the shaft. Thereby, either a largely uniform loading over the complete periphery of the sleeve is then effected, which renders an accordingly large-surfaced contact of the clamping jaws possible, or a deformation of the sleeve is effected in such a way that the non-positive connection between the sleeve and the shaft is only effected by restricted contact areas of the sleeve, by which a higher contact pressure is achievable without damaging the shaft.

Preferably, the sleeve is deformable by the clamping jaws such that the inner contour of the sleeve at least partially adapts to the outer contour of the shaft. Thereby, the cross section of the inner contour of the sleeve is not exactly circular any more, but forms circumferentially restricted contact areas of the sleeve, which adapt to the outer contour of the shaft, for effecting the non-positive connection with the shaft only where the clamping jaws peripherally engage with the sleeve.

Preferably, the sleeve comprises a first axial section and a second axial section, wherein the clamps only engage with the outer contour of the first axial section of the sleeve. Thereby, the design of a cartridge shaft seal known from the above-mentioned prior art may remain essentially unamended in many parts, wherein the sleeve is axially longer by the first axial section compared to the known design in order to establish an engaging surface for the clamps embracing the first axial section. The end of the first axial section facing away from the second axial section may comprise a slightly widened inner contour (e.g. 1-10%) for facilitating the insertion of the shaft.

According to an advantageous further development of the invention, each clamping component comprises a guide surface which is distanced to the sleeve and which is actively connected to a mating guide surface which is arranged on the adjacent clamping component, wherein the guide surfaces lie in plane which lies parallel to the middle longitudinal axis of the next adjacent screw which connects a clamping component to the adjacent clamping component, and/or parallel to a tangent to the sleeve or at an acute angle, preferably at an angle of up to 3 to this. These guide surfaces and mating guide surfaces ensure that a defined movement of the clamping jaws to one another and to the sleeve is effected on tightening the screw connection and that in particular no transverse forces act upon the screw/screws. The arrangement of guide surfaces at an acute angle of up to 3 to the longitudinal axis of a screw which connects the clamping component to the adjacent clamping component has the advantage of an additional clamping effect in the direction transverse to the screw axis, where comparatively large forces can be mustered by way of the previously mentioned shallow angle.

The arrangement and the design of the clamping components is preferably such that the guide surfaces and the mating guide surfaces are each arranged between a screw which connects two clamping components to one another and the outer periphery of the sleeve. Such a design is space-saving and effective, since the guidance is effected close to the sleeve and therefore has the effect of comparatively stiff clamping components.

According to an alternative embodiment of the invention, a guide surface and a mating guide surface can each be formed on a guide pin and on a recess which receives the pin. The guide surface then advantageously extends over the whole outer periphery of the pin, and the mating guide surface around the complete inner periphery of the recess or possibly also only parts of the surfaces of pins and recesses. Such an arrangement is particularly advantageous given the provision of two clamping components which are preferably configured identically, and then a pin and a recess offset to this by about 180° with respect to the shaft axis are provided on each clamping component and positively engage into one another, so that the clamping components encompass the sleeve over the whole periphery.

In order on the one hand to achieve a sufficient clamping effect which deforms the sleeve preferably only elastically so as to non-positively bear on the shaft, but on the other hand to muster a sufficient clamping force, it is useful if a clamping jaw extends only over a comparatively small peripheral angle of the sleeve, and specifically between 30° and 50°, preferably between 40° and 45°. The specified values are of course dependent on the number of clamping jaws which are arranged over the periphery as well their extension in width. The above-mentioned angle specifications have been found to be advantageous for two clamping jaws distributed over the periphery, and here it is particularly advantageous if, apart from the clamping jaws extending over the above peripheral angle, a clamping component comprises a further contact surface which is provided for contact of the clamping component on the sleeve and which is peripherally distanced to the clamping jaw. The further contact surface preferably serves to facilitate the centering during assembly, i.e. the contact between the further contact surface and the sleeve may essentially be forceless or may occur only temporary during assembly.

A distanced region which extends over an angle between 80° and 110° with respect to the periphery of the sleeve is advantageously provided between the clamping jaw and the further contact surface of the same clamping component. Thus, a region between 80° and 110° and which is distanced to the sleeve is therefore advantageously provided between the clamping jaw and the further contact surface of the clamping component.

Here, the at least one contact surface of a clamping jaw is arranged adjacent to a guide surface or mating guide surface of the same clamping component, and specifically in a manner away from this. This arrangement ensures that the screw connection between adjacent clamping jaws remains largely free of transverse forces.

According to the invention, one therefore envisages the arrangement of the clamping jaws being effected peripherally such that the clamping forces acting upon the sleeve are larger in the transverse direction to the longitudinal axis of the connecting screw than the clamping forces which are directed in the longitudinal direction or parallel to the screw.

The cartridge shaft seal according to the invention for a centrifugal pump of the above mentioned type comprises a first slide ring which is provided for the rotationally fixed arrangement close to the casing opening of the pump casing and which comprises an axial sliding and sealing surface which bears on an axial sliding and sealing surface of a second slide ring, said second slide being provided for the rotationally fixed arrangement on a shaft which passes through the casing opening. The cartridge shaft seal comprise a sleeve and a clamping device which is arranged on the sleeve and which comprises clamps, and further comprises a spring arrangement for subjecting the sliding and sealing surfaces to an axial force onto one another, as well as sealing means for sealing the sleeve with respect to the shaft and for sealing at the casing side. According to the invention, the cartridge shaft seal is configured such that the clamps of the clamping device engage only on the outer side of the sleeve and specifically in a manner such that the sleeve is only non-positively connected to the shaft. This arrangement is particularly advantageous, since no compromising of the surface of the shaft whatsoever occurs due to the fixation of the cartridge shaft seal on the shaft by way of the clamping device, so that on exchanging the sealing ring, this sealing ring which is in the form of an O-ring and which is typically to be arranged between the sleeve and the shaft can be pushed on without any the danger of damage.

According to the invention, the clamping device can advantageously be releasably arranged on the sleeve, so that the possibility of disassembly of the cartridge shaft seal exists, so that individual components of this seal can be exchanged, serviced or replaced.

The invention is hereinafter explained in more detail by way of an embodiment example which is represented in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
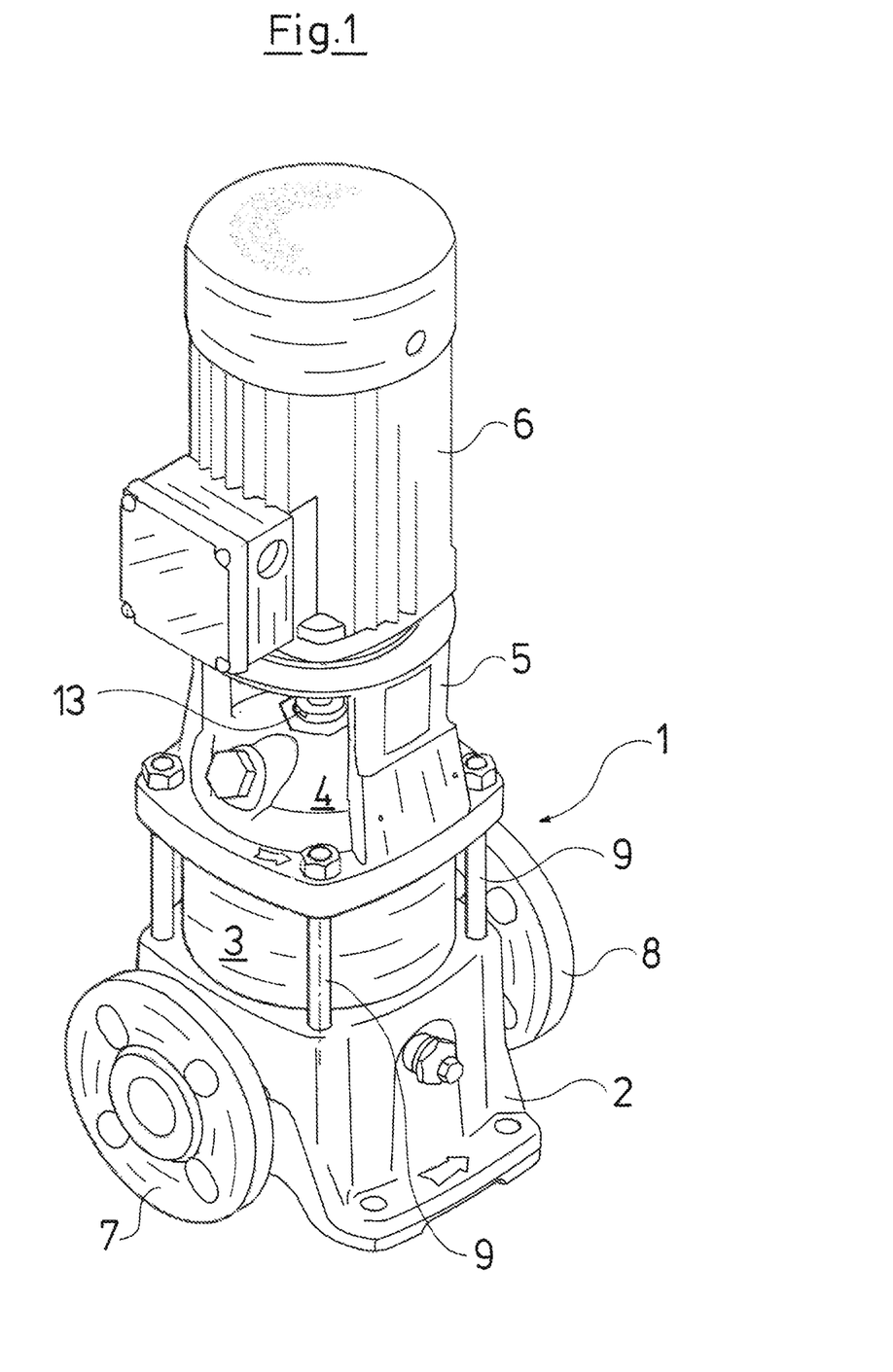
FIG. 1 is a greatly simplified, perspective representation a multi-staged inline centrifugal pump with a connected motor.

Referring to the drawings, the pump represented in FIG. 1 is a multi-stage centrifugal pump 1 of the inline construction type with a vertical, i.e. upright rotation axis. In the manner known per se, the pump comprises a foot 2, with which the pump 1 stands on the ground and with which the pump 1 can be fastened at the ground side. A cylindrical jacket component 3 extends from the pump foot 2 and is received towards the top by a pump head 4 which comprises a motor stool 5, to whose upper flange an electric motor 6 is fastened. A pump casing comprises the foot 2, the jacket 3 and the head 4.

Figure 2:
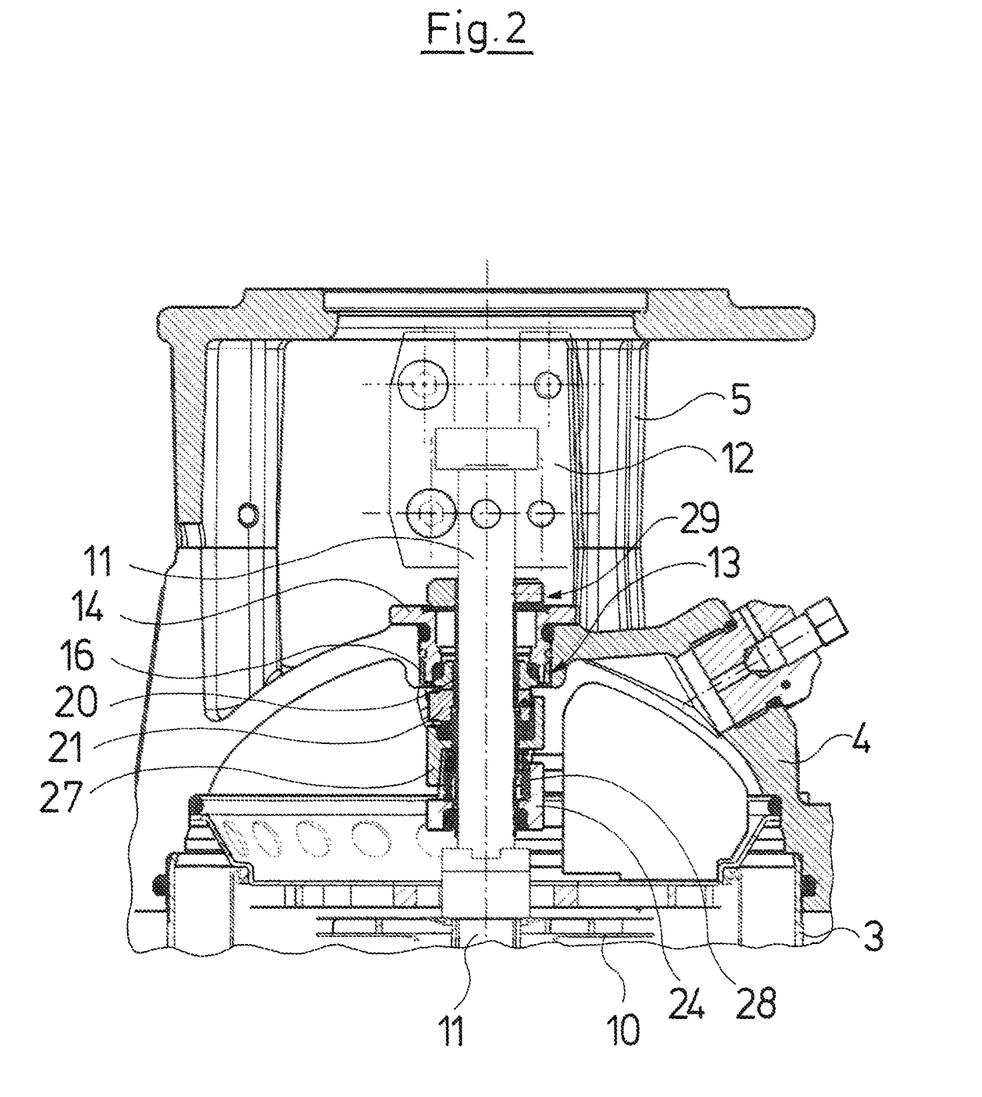
FIG. 2 is a longitudinal sectional view through the head of the pump casing with the motor stool.

The foot 2 comprises a first connection flange 7 of a suction conduit as well as a second connection flange 8 of a delivery conduit which is arranged on the same axis at the other side to this. Pump stages, each comprising of an impeller 10 and a diffuser connecting thereto are arranged within the region of the jacket 3, so that the fluid which enters through the suction conduit at the first connection flange 7 into the pump casing runs from the bottom to the top through the pump stages amid an increase of pressure. The outlet of the last stage is led via an annular channel. The annular channel inner wall is formed by the outer wall of the diffusers and the annular channel outer wall is formed by the jacket 3. The annular channel leads the fluid back into the foot 7 and there to the delivery conduit on the second connection flange 8. The diffusers as well as the jacket 3 are clamped between the pump head 4 and the pump foot 2 by way of four tie-rods 9. The impellers 10, of which that one of the last pump stage is visible in FIG. 2, are seated on a shaft 11 in a rotationally fixed manner, said shaft 11 being led out of the pump casing in the region of the pump head 4 and there being connected to the free shaft end of the electric motor 6 by way of a coupling 12. The leading of the shaft 11 through the pump head 4 is realized by way of a cartridge shaft seal 13, the construction of which is evident in detail from FIGS. 3-5.

Figure 3:
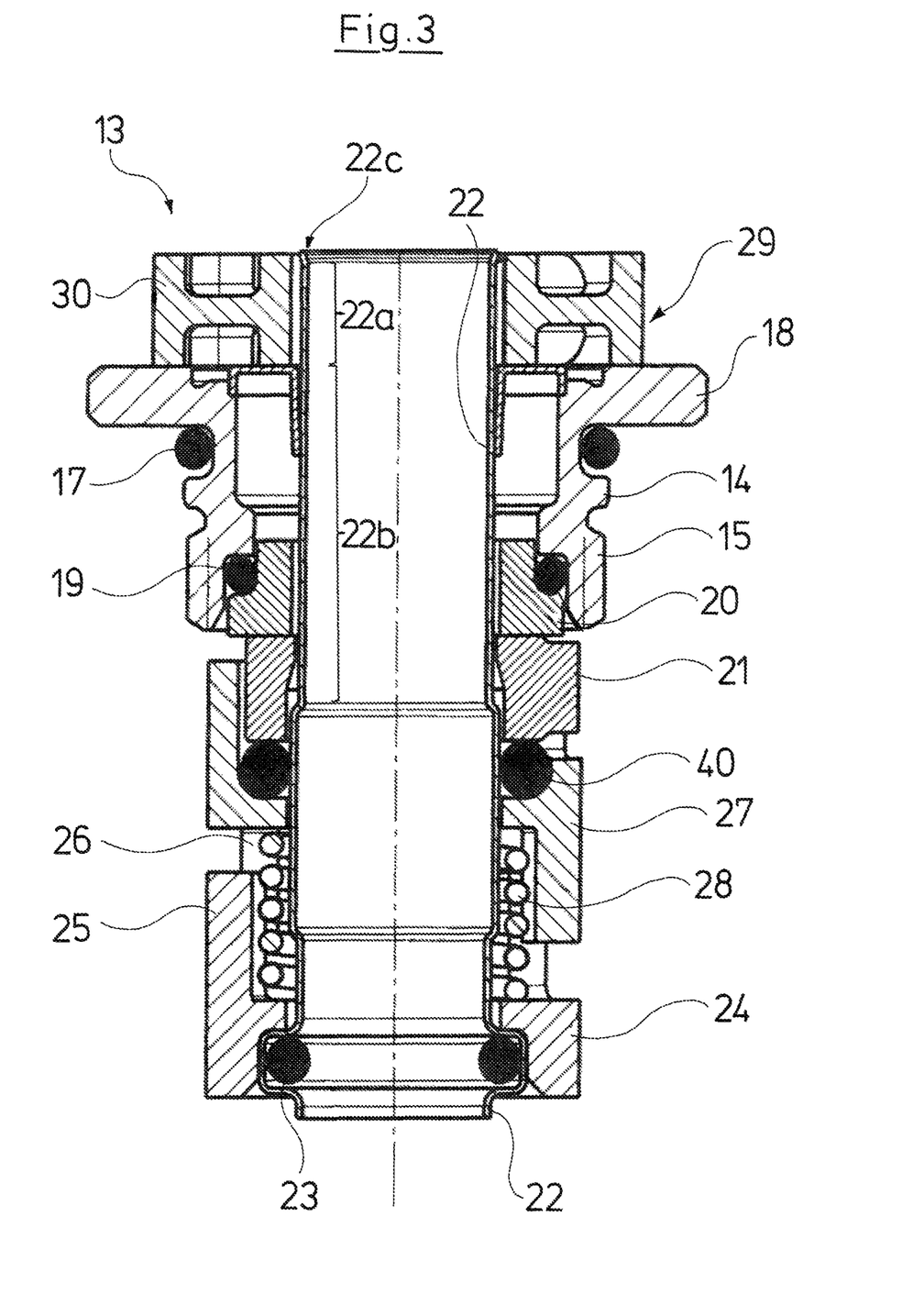
FIG. 3 is a greatly simplified, longitudinal sectional view through the cartridge shaft seal.
Figure 4:
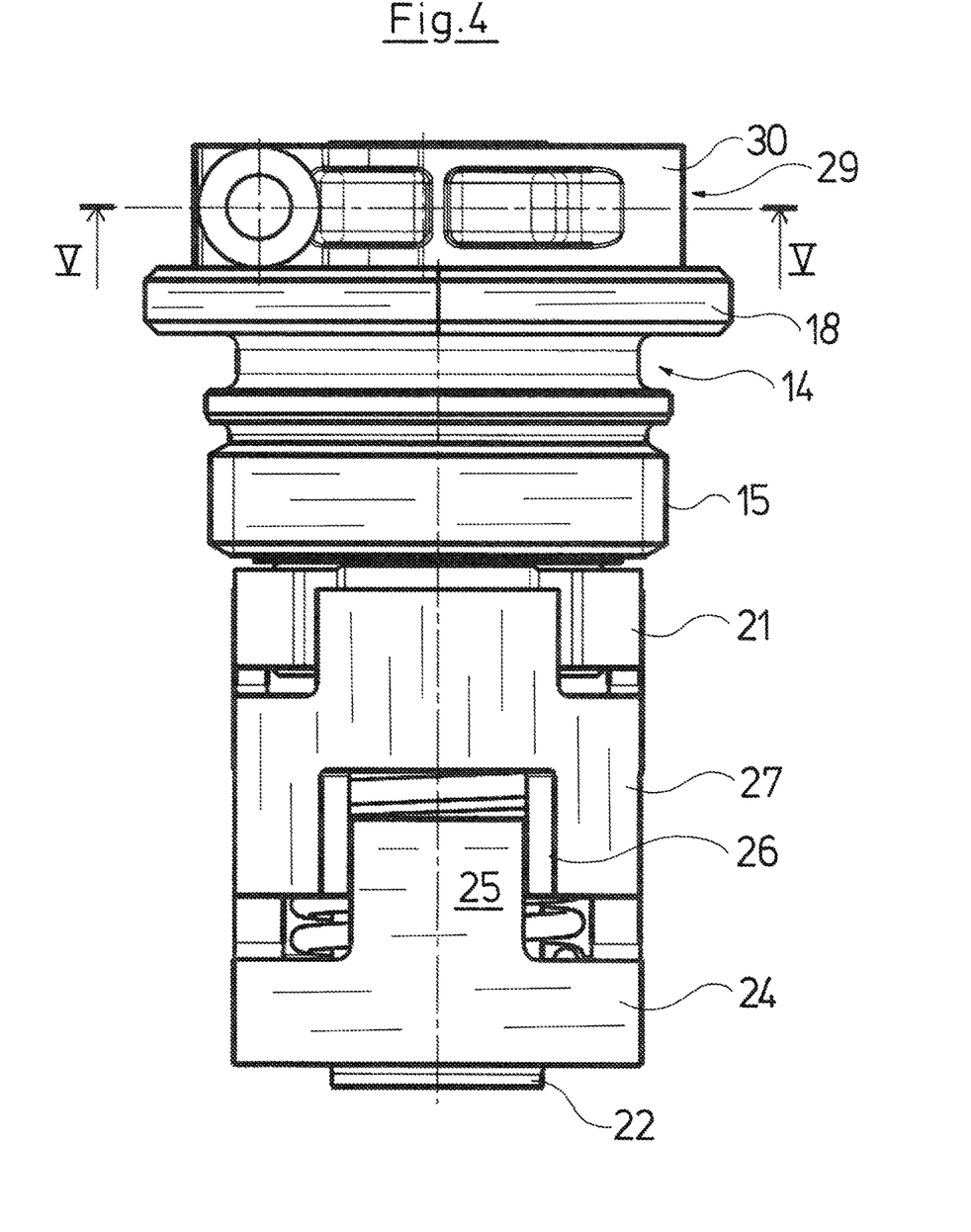
FIG. 4 is a lateral view of the cartridge shaft seal.
Figure 5:
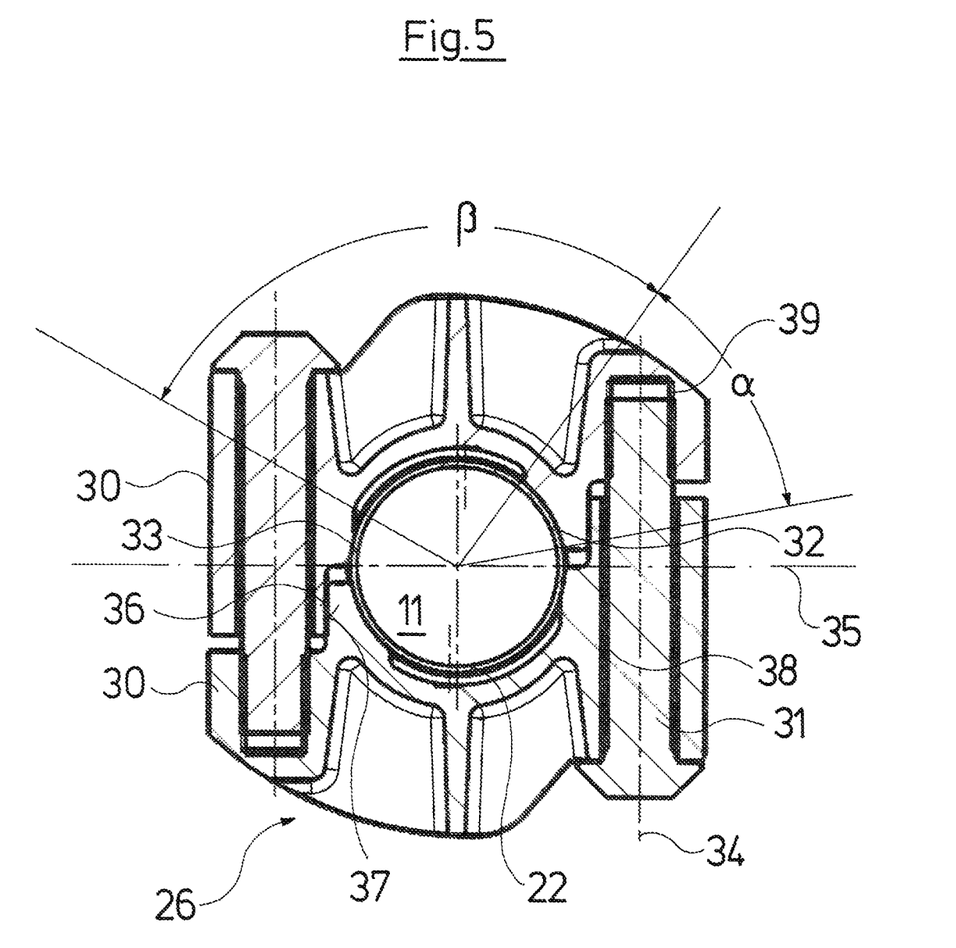
FIG. 5 is a sectional view along the section line V-V in FIG. 4.

The cartridge shaft seal 13 comprises a carrier 14 having an annular configuration and comprises an outer thread 15, with which the carrier 14 is fastened in a corresponding inner thread of an opening 16 of the pump casing, in particular of the pump head 4, amid the integration of an O-ring 17. Here, a flange 18 of the carrier 14 bears on the upper side of the pump head 4 in a manner surrounding the opening 16. A stationary slide ring 20 has a lower side that forms the actual sliding and axial sealing surface and on which the upper side of a rotating slide ring 21 bears as a mating surface. The stationary slide ring 20 is fixed in this carrier 14 in a rotationally fixed manner amid the integration of an O-ring 19. The rotating slide ring 21 is seated on a sleeve 22, rotationally fixed but axial movable thereto. The sleeve surrounds the shaft 11 in the region of the casing opening 16 and being connected to the shaft 11 in a rotationally fixed manner. The sleeve 22 is sealed with respect to the shaft 11 by way of an O-ring 23 and this O-ring 23 and is seated within a ring 24 which is fixedly connected to the sleeve 22. The ring 24 comprises two diametrically arranged lugs 25 which extend upwards from the upper side of the ring 24 and are seated in a ring 27 in a manner engaged with corresponding recesses 26. The ring is connected to the rotating slide ring 21 rotationally fixed and axially supporting this via a helical spring 28 which is arranged between the rings 24 and 27. An O-ring 40 which bears axially on the side of the slide ring 21 which is away from the sliding surface 21, as well as opposite and away from this, in a groove-like recess of the ring 27 which is open to the top, radially inwardly on the sleeve 22, is integrated between the rotating slide ring 21, the ring 27 and the sleeve 22. A sealing means is comprised of the O-rings. Inasmuch as this is concerned, the construction of the cartridge shaft seal 13 corresponds largely to the known cartridge shaft seals as are installed with Grundfos pumps of the type CR, which is referred to inasmuch as this is concerned.

The fastening of the cartridge shaft seal 13 at the casing side is effected by way of the carrier 14. The fastening of the sleeve 22 at the shaft side is effected by way of a clamping device 29 which annularly encompasses the sleeve 22 and comprises two identically configured clamping components 30 which are connected to one another by way of two screws 31 and are non-positively fixed on the sleeve 22. With this configuration, the force action is so high that the sleeve 22 elastically deforms in the region of the clamping device 29 and is non-positively pressed onto the shaft 11, so that a non-positive fit is effected in the axial as well as rotation direction. The clamping device 29 is non-positively fixed on the sleeve 22 and this sleeve 22 is non-positively fixed on the shaft 11, by way of tightening the screws 31.

In FIG. 3, the sleeve 22 protrudes out of the carrier 15 by an upper first axial section 22a and is only embraced by the clamping device 29 in that upper first axial section 22a. A lower second section 22b is embraced by the carrier 14. In order to facilitate the insertion of the shaft 11, the upper end 22c of the first axial section 22a of the sleeve 22 facing away from the second section 22b comprises a slightly (e.g. 1-10%) widened inner contour.

The clamping components 30 comprise clamping jaws 32 which are adapted to the outer contour of the sleeve 22 and bear on this. These clamping jaws extend over an angle α of the periphery of the sleeve 22 of 43 and are arranged diametrically to one another. Seen in the peripheral direction, a region which is designed distanced to the sleeve 22 and which extends over an angle ß of 95° connects to a clamping jaw 32 of a clamping component 30, after which a further contact surface 33 as a support surface connects, wherein this however only extends over a few degrees of the periphery. A peripheral extension of about 170° therefore results for each clamping component 30, so that a free space of a few degrees remains at the ends.

Defined contact surfaces are formed via the support surfaces 33 and the clamping jaws 32 and the force application is effected by way of the screws 31. The screws 31 each have longitudinal axes 34 that are arranged perpendicularly to a radial partition plane 35 and parallel to tangents to the sleeve 22.

The clamping jaws 32 and the support surfaces 33 are arranged close to the partition plane 35 and each clamping jaw 32 lies away from the sliding surface 36 of the same clamping component 30. The sliding surfaces 36 lie tangentially or parallel to this and parallel to the axes 34 of the screws 31, and are in contact with the mating sliding surfaces 37. These sliding surfaces 36 and mating sliding surfaces 37, which bear on one another in pairs, form guides and determine the direction, in which the clamping components 30 are movable to one another. They ensure that the screws 31 are kept largely free of transverse forces and together with the clamping jaws 32 form a formation which is roughly wedge shaped in cross section and which ensures that on moving the clamping components 30 to one another, thus on tightening the screws 31, transverse forces upon the sleeve 22 are produced, and these forces are larger than the longitudinal forces upon the clamping jaws, said longitudinal forces being caused by the tensile force of the screws 31. With this configuration, it is ensured that on tightening the screws 31 with the required torque, precisely that clamping force which is necessary to non-positively fix the sleeve 22 on the shaft 11 is provided. These surfaces 36, 37 can possibly be inclined by a few degrees, in order to further increase the clamping forces.

Alternatively, but not represented in the embodiment example, the sliding surfaces and mating sliding surfaces can also each be formed by a pin and a recesses, provided as a matching piece to the pin. The clamping component on the one side comprises a pin and on the other side a recess, so that a peripheral surface of the pin forms a sliding surface and an inner peripheral surface of the recess forms a mating sliding surface.

In the represented embodiment, the clamping device 29 is formed by two identical clamping components 30 and two screws 31, wherein the screws with their head rest on a head rest surface of the clamping component 30, are led through a bore-like recess (bore) 38 and are fixed in a blind hole 39 which is provided with an inner thread. For assembly, the cartridge shaft seal 13 is pushed over the free end of the shaft 11 and is fixed by way of screwing the carrier 14 into the opening 16 of the pump casing. After the clamping components 30 have been loosely connected to one another by way of screws 31, the clamping device 29 is then likewise pushed from above over the shaft 11, until the clamping device 29 lies loosely on the upper side of the carrier 14. The screws 31 are then uniformly tightened with a predefined torque, whereupon the clamping device 29 is non-positively fastened on the sleeve 22 in a manner such that the sleeve 22 is deformed elastically towards the shaft 11 and is fixed there, likewise non-positively.

The cartridge shaft seal 13 can also be removed in the reverse sequence after undoing the screws 31. Since the clamping device 29 is only non-positively connected to the shaft 22, the complete cartridge shaft seal 13 can be taken apart and possibly repaired by way of exchanging worn parts. Since the sleeve 22 only bore non-positively on the shaft 11, the surface of the shaft 11 remains uncompromised due to this, so that the O-ring 23 which seals the sleeve 22 with respect to the shaft 11 can neither be damaged on disassembly nor on assembly of the cartridge shaft seal 13.

While specific embodiments of the invention have been shown and described in detail to illustrate the application of the principles of the invention, it will be understood that the invention may be embodied otherwise without departing from such principles.

APPENDIX

List of Reference Numerals

1—centrifugal pump
2—pump foot
3—jacket/jacket component
4—pump head
5—motor stool
6—electric motor
7—first connection flange suction conduit
8—second connection flange delivery conduit
9—tie rod
10—impellers
11—shaft
12—coupling
13—cartridge shaft seal
14—carrier
15—outer thread
16—opening in the pump casing
17—O-ring
18—flange 19—O-ring
20—slide ring stationary
21—slide ring rotating
22—sleeve
22a—first axial section of the sleeve
22b—second axial section of the sleeve
22c—end of the first axial section of the sleeve
23—O-ring
24—ring
25—lug
26—recesses
17—ring
28—helical spring
29—clamping device
30—clamping components
31—screws
32—clamping jaws
α—angle over which the clamping jaws extend
ß—angle between the clamping jaw and further contact surface
33—further contact surface, support surface
34—longitudinal axis of 31
35—partition plane
36—sliding surfaces/guide surfaces
37—mating sliding surfaces/mating guide surfaces
38—recess
39—pocket hole
40—O-ring

What is claimed is:

1. A single-stage or multi-stage centrifugal pump comprising:
a pump casing;
a shaft rotatably mounted in the pump casing;
at least one impeller arranged on the shaft in a rotationally fixed manner for delivering fluid; and
a cartridge shaft seal arranged between the shaft and an opening of the casing, through which opening the shaft is led, the cartridge shaft seal comprising a sleeve surrounding the shaft at least in the region of the opening and a clamping device comprising:
screws; and
at least two clamping components which surround the sleeve in sections and which, via the screws arranged tangentially or parallel to the at least two clamping components, are connected to one another such that clamping forces acting on the sleeve via the clamping components are exerted by way of tightening the screws, each clamping component comprising at least one clamping jaw which bears on the sleeve and which is adapted to an outer contour of the sleeve or an outer contour of the shaft or both an outer contour of the sleeve and an outer contour of the shaft, the sleeve being releasably and rotationally fixedly connected to the shaft via the clamping device, the clamping device being arranged on an outer side of the sleeve, wherein the clamping components of the clamping device engage only on an outer side of the sleeve such that the sleeve is only non-positively connected to the shaft, and wherein the sleeve comprises a first axial section and a second axial section and the at least two clamping components of the clamping device only engage with the outer contour of the first axial section of the sleeve.

2. A centrifugal pump according to claim 1, wherein the clamping device is releasably connected to the sleeve.

3. A centrifugal pump according to claim 1, wherein each screw connects two adjacent clamping components to one another and is arranged perpendicularly to a radial partition plane of the clamping components which are to be connected.

4. A centrifugal pump according to claim 1, wherein the at least two clamping components are configured in an identical manner.

5. A centrifugal pump according to claim 1, wherein the sleeve is at least partially deformable by the clamping jaw such that the inner contour of the sleeve at least partially adapts to the outer contour of the shaft.

6. A centrifugal pump according to claim 1, wherein:
each clamping component has a guide surface which is distanced to the sleeve and which is actively connected to a mating guide surface which is arranged on the adjacent clamping component;
the guide surfaces lie in a plane which lies parallel to a middle longitudinal axis of the next adjacent screw or parallel to a tangent to the sleeve or at an acute angle.

7. A centrifugal pump according to claim 6, wherein the guide surfaces and the mating guide surfaces are each arranged between a screw which connects two clamping components to one another and the outer periphery of the sleeve.

8. A centrifugal pump according to claim 6, wherein a guide surface and a mating guide surface are formed on a guide pin and on a recess which receives the guide pin.

9. A centrifugal pump according to claim 1, wherein a clamping jaw extends over a peripheral angle of the sleeve, between 30° and 50°.

10. A centrifugal pump according to claim 1, wherein a clamping component comprises a further contact surface which is provided for contact of the clamping component on the sleeve and which is peripherally distanced to the clamping jaw.

11. A centrifugal pump according to claim 10, wherein the clamping component comprises a region between the clamping jaw and the further contact surface, said region being distanced to the sleeve and extending over an angular region of between 80° and 110°.

12. A centrifugal pump according to claim 1, wherein the at least one contact surface of each clamping jaw is adjacent to a guide surface of the same clamping component and is arranged away from this guide surface.

13. A centrifugal pump according to claim 1, wherein the peripheral arrangement of the clamping jaws is effected such that clamping forces acting upon the sleeve are greater in a transverse direction to a longitudinal axis of the connecting screw than clamping forces which are directed in a longitudinal direction or parallel to the screw.

14. A cartridge shaft seal for a centrifugal pump including a pump casing, a shaft rotatably mounted in the pump casing and at least one impeller arranged on the shaft in a rotationally fixed manner for delivering fluid, the cartridge shaft seal being arranged between the shaft and an opening of the pump casing, through which opening the shaft is led, the cartridge shaft seal comprising:
a sleeve surrounding the shaft at least in the region of the opening; and
a clamping device comprising:
screws; and
at least two clamping components which surround the sleeve in sections and which, via the screws arranged tangentially or parallel to the at least two clamping components, are connected to one another such that clamping forces acting on the sleeve via the clamping components are exerted by way of tightening the screws, each clamping component comprising at least one clamping jaw which bears on the sleeve and which is adapted to an outer contour of the sleeve or an outer contour of the shaft or both an outer contour of the sleeve and an outer contour of the shaft, the sleeve being releasably and rotationally fixedly connected to the shaft via the clamping device, the clamping device being arranged on an outer side of the sleeve, wherein the clamping components of the clamping device engage only on an outer side of the sleeve such that the sleeve is only non-positively connected to the shaft, and wherein the sleeve comprises a first axial section and a second axial section and the at least two clamping components of the clamping device only engage with the outer contour of the first axial section of the sleeve.

15. A cartridge shaft seal according to claim 14, further comprising:

a first slide ring;
a second slide ring, the first slide ring being rotationally, fixedly arranged close to the opening of the pump casing and comprising an axial sliding and sealing surface which bears on an axial sliding and sealing surface of the second slide ring, provided for being rotationally, fixedly arranged on the shaft passing through the casing opening, wherein the clamping device, arranged on the sleeve comprises a plurality of clamps;
spring means for subjecting the sliding and sealing surfaces to an axial force onto one another; and
sealing means for sealing the slide rings.

16. A cartridge shaft seal according to claim 14, wherein each screw connects two adjacent clamping components to one another and is arranged perpendicularly to a radial partition plane of the clamping components which are to be connected.

* * * * *